United States Patent Office 3,213,743
Patented Oct. 26, 1965

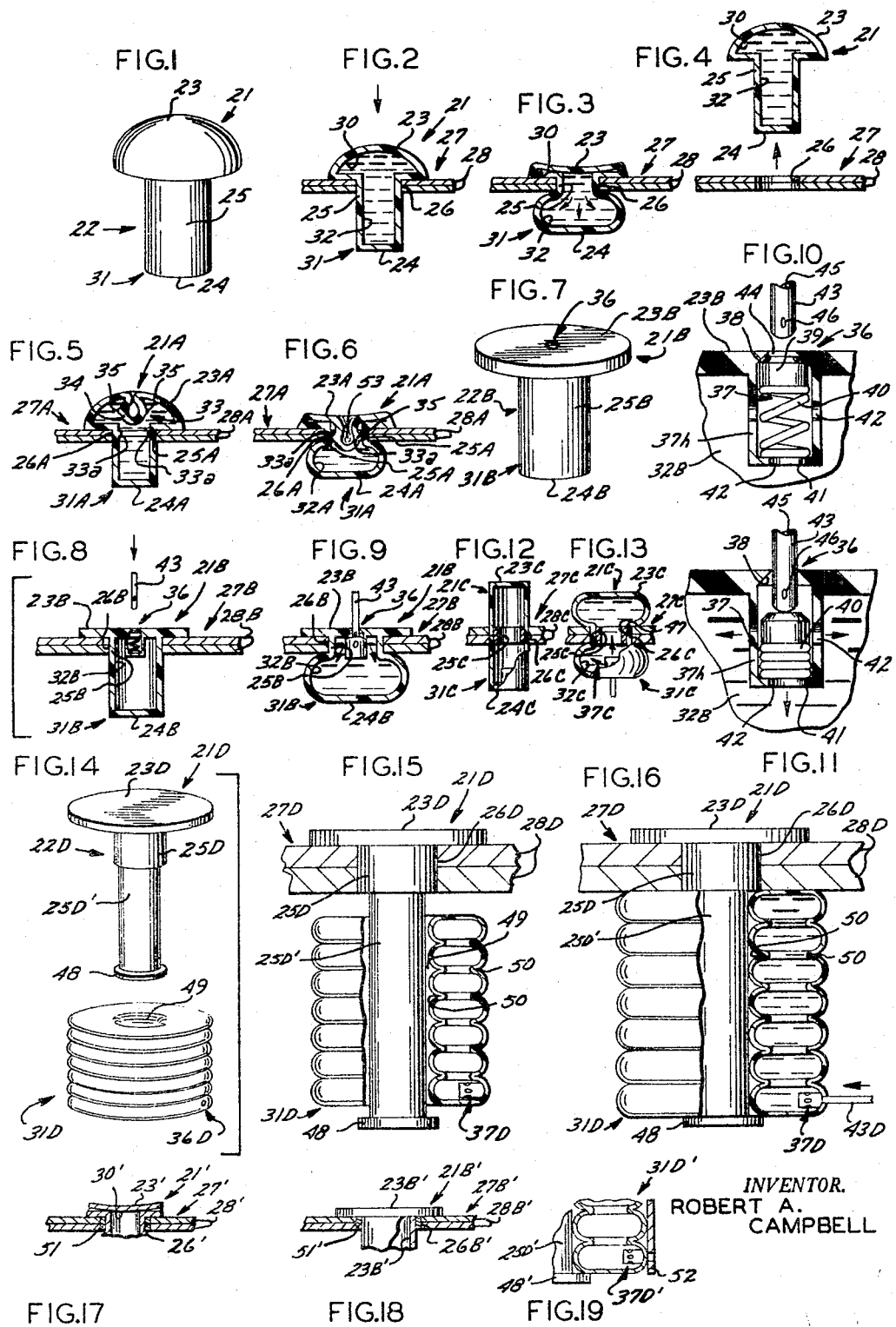

1

3,213,743
FASTENER MEANS INCLUDING AN INTERIOR FLUID - PRESSURE EXPANDABLE LOCKING PORTION
Robert A. Campbell, 167 N. Ridgeland Ave., Oak Park, Ill.
Filed July 16, 1963, Ser. No. 295,349
9 Claims. (Cl. 85—65)

Generally speaking, the present invention relates to the fastener art and, more particularly, pertains to a novel type of fastener means adapted to be used in lieu of conventional rivets, bolts and nuts, and various types of mechanical fasteners and which effectively comprises a fastener means including at least one interior fluid-pressure expandable locking portion. It will readily be understood that the novel fastener means of the present invention may, for example, assume a configuration generally similar to a conventional rivet and including a longitudinal fastener element having first and second end portions and an intermediate shank portion therebetween adapted to be inserted into a through-aperture in structural member means to which the fastener means is adapted to be fastened. The first end portion is adapted to be positioned on one side of said structural member means and the second end portion is adapted to be positioned on the other side of said structural member means, with one of said end portions comprising a head which may be initially larger than the through-hole in the structural member means or which may be adapted to be effectively expanded by interior fluid pressure into such an enlarged configuration. The other of said end portions is effectively provided with an interior fluid-pressure expandable retaining means which is adapted to be effectively expanded by an increase in interior fluid pressure so as to cause enlargement thereof to a transverse dimension greater than the through-aperture in the structural member means whereby to firmly lock the entire fastener means to said structural member means.

In one form of the invention, the means for increasing the interior fluid pressure in the expandable retaining portion (and, in certain cases, in the head when it is of the fluid-pressure expandable type) comprises normally closed inlet-outlet valve means in interior communication with said expandable means for the forcible reception of a quantity of pressurized fluid from an auxiliary source of pressurized fluid, such as a pump means, syringe means, or the like.

In another form of the invention, the means for increasing the interior fluid pressure in the expandable portion, portions, or means comprises an interior chamber means filled with fluid means in communication with said expandable means and adapted to be forcibly collapsed and to retain the collapsed configuration after such forcible collapsing thereof whereby to force the fluid means previously contained therein to flow into the expandable retaining portion or means, which necessarily must expand. In one specific version of this form of the invention, the collapsible interior chamber means may be within a first end portion comprising an enlarged head carried at the upper or rear end of the intermediate shank portion, while the fluid-pressure expandable retaining portion or means may comprise a second end portion of the intermediate shank portion which has been inserted through the aperture in the structural member means to the other side thereof.

Also, in one form of the invention, the interior fluid-pressure expandable retaining portion or means may not be integrally connected to the longitudinal fastener member but may comprise a separate centrally apertured hollow chamber-defining means having its central aperture

2 carried around the intermediate shank portion of the fastener member from a position adjacent the second or lower end portion thereof, which is provided with enlarged abutment means, to a position adjacent to the surface of said structural member means opposite from the head end of the longitudinal fastener member. In this version of the invention, said separate expandable retaining portion or means is provided with normally closed inlet-outlet valve means into the interior thereof for the forcible reception of pressurized fluid thereinto whereby to expand said retaining means so as to firmly abut the intermediate shank portion of the fastener member, the abutment means at the forward or bottom end thereof, and the structural member means nearest to said abutment means. The pressurized fluid may be supplied from any suitable source of pressurized fluid and, in certain forms of the invention, may comprise a hand pump, syringe, or the like, although not specifically so limited.

It should be noted that the form of the invention wherein a portion of the interior chamber means is forcibly collapsed will, in one form, be made of a suitable material having structural characteristics such that the stresses produced as a result of the collapsing thereof will exceed the yield point of the material so as to yieldably deform into the flattened configuration. This may be accomplished while the material is at normal room temperature or while the material is temporarily heated to a desirable working temperature to facilitate the collapsing operation.

In another version of the collapsible chamber form of the invention, the collapsible portion may be provided with engagement means adapted to retain it in collapsed relationship after the collapsing operation is completed.

In the version of the collapsible chamber form of the invention which is provided with engagement means for retaining it in the collapsed position, the material of the collapsible chamber portion may be of a type having structural characteristics such that the stresses produced as a result of the collapsing thereof will not exceed the yield point of the material (although in other forms, the yield point of the material will be exceeded). This will allow the collapsible chamber portion to reassume its original pre-collapse configuration when the engagement means are controllably disengaged.

In certain forms of the invention, the interior fluid-pressure expandable portion or means may be made of a material having structural characteristics such that the stresses produced as a result of the expansion thereof will exceed the yield point of the material so as to yieldably expand into the enlarged retaining configuration and to remain in said configuration thereafter.

In other forms of the invention, the interior fluid-pressure expandable retaining portion or means may be made of a material having structural characteristics such that the stresses produced as a result of the expansion thereof will not exceed the yield point of the material. In this version, it will be understood that release of the interior pressure by removal of some of the interior fluid or by opening up the collapsed chamber portion to allow some of said fluid to be transferred thereinto, will allow said retaining portion to reassume its initial pre-expansion configuration and size.

In the form of the invention wherein the interior fluid-pressure expandable retaining means is of a separable centrally apertured type adapted to be exteriorly carried by the forward part of the intermediate shank portion of the fastener member, said expandable retaining means may be provided with outer confining means therearound for limiting the expansion thereof substantially to inward radial expansion toward the intermediate shank portion of the fastener member and/or the longitudinal expansion between the abutment means at the forward or bottom end of the shank portion and the surface of the structural member means nearest thereto.

In any or all forms of the invention, that part of the intermediate shank portion adapted to lie in the through aperture in the structural member means after the fastening operation has been completed may initially be made of a material of great structural strength or may be provided with auxiliary stiffener means (either inside thereof or outside thereof) whereby to be capable of withstanding the substantial shear stresses which may be imposed thereon by the structural member means.

It is an object of the present invention to provide novel fastener means of the generic type referred to hereinabove which may assume any of the various exemplary specific types referred to hereinbefore and which is adapted for use in lieu of standard mechanical fasteners under a great many conditions of use, and which is of extremely simple, inexpensive, easy-to-install, easy-to-remove, virtually foolproof construction such as to be conducive to widespread use thereof.

Further objects are implicit in the detailed description which follows hereinafter for exemplary rather than limiting purposes and will be apparent to persons skilled in the art after a careful study thereof.

For the purpose of clarifying the nature of the present invention, several exemplary embodiments are illustrated in the hereinbelow-described figures of the accompanying drawings and are described in detail hereinafter.

FIG. 1 is a pre-installation perspective view of one exemplary embodiment of the present invention.

FIG. 2 is a smaller-scale sectional view on a longitudinal center plane through the fastener means of FIG. 1 at the completion of a first step in a sequence of steps involved in fastening it to the structural member means comprising two sheets or plates illustrated for exemplary but not limiting purposes in FIG. 2.

FIG. 3 is a view similar to FIG. 2, but illustrates the fastener means after the completion of a second and final step involved in fastening the fastener means firmly to the structural member means.

FIG. 4 illustrates the same fastener means after the fastening step shown in FIG. 3 has been reversed by forcibly collapsing (by suitable tool means not shown) the lower enlarged retaining portion into its initial configuration of FIG. 2 to allow removal of the fastener means.

FIG. 5 is a view similar to FIG. 2 but illustrating a modified form of the invention wherein the collapsible head defining the collapsible interior chamber is provided with engagement means adapted to engage mating engagement means carried by the inside of the shank portion for retaining the head in the collapsed configuration shown in FIG. 6.

FIG. 6 is a view similar to FIG. 5 showing the retained collapsed position of the head.

FIG. 7 is a perspective view of a modified form of the invention including an initially enlarged head and a hollow shank portion adapted to have its lower end, comprising expandable retaining means, expanded by interior fluid pressure created as a result of fluid forcibly inserted through normally closed inlet-outlet valve means in the head.

FIG. 8 is a sectional view showing the fastener means of FIG. 7 after it has been placed with its shank portion extending through an aperture in the structural member means and is ready to receive a hollow apertured insertion needle member for the forcible insertion of pressurized fluid into the hollow shank of the fastener means.

FIG. 9 is a view similar to FIG. 8, but shows the device after a quantity of fluid has been forcibly inserted into the hollow interior thereof and has forcibly expanded the retaining means at the lower end of the shank into a fully locked relationship with respect to the structural member means. The next step would be the removal of the hollow apertured insertion needle means and the automatic closure of the inlet-outlet valve means.

FIG. 10 is an enlarged fragmentary sectional view illustrating one exemplary form of the normally closed inlet-outlet valve means illustrated in FIG. 8.

FIG. 11 is a view similar to FIG. 10, but shows the inlet-outlet valve means in the forcibly opened position of FIG. 9 resulting from insertion of the hollow apertured insertion needle into the hole at the top thereof whereby to allow pressurized fluid to be forcibly fed into the hollow chamber means.

FIG. 12 is a fragmentary, partly sectional view of another modified form of the invention adapted to have fluid forcibly inserted thereinto in the manner of FIGS. 8–11, but modified so that the insertion operation effectively causes both ends of the hollow shank to expand so as to comprise expanded retaining means locking the entire device with respect to the structural member means in the manner shown in FIG. 13.

FIG. 13 shows the locked configuration of the fastener means of FIG. 12.

FIG. 14 is an exploded view of another modification of the invention wherein the expandable retaining means is separate from the fastener member and comprises a centrally apertured hollow chamber-defining means adapted to be carried and retained by the lower shank portion of the fastener member in the manner shown in FIG. 15.

FIG. 15 is a view partly in elevation and partly in section showing the fastener means of FIG. 14 in assembled relationship after insertion of the fastener member through the hole in the structural member means and before the controlled forcible expansion of the expandable retaining means in the manner shown in FIG. 16.

FIG. 16 illustrates the fastener means of FIG. 15 during the act of having the retaining portion expanded by the hollow apertured insert needle which is shown inserted into the normally closed inlet-outlet valve means. This will continue until the retaining means is fully enlarged in a manner such as to firmly lock the fastener means with respect to the structural member means, after which the hollow apertured insertion needle means is removed and the inlet-outlet valve means will automatically close.

FIG. 17 illustrates, in fragmentary sectional form, a modification of the first form of the invention wherein it is made of a different type of material having different structural characteristics and wherein it is provided with stiffening intermediate sleeve means of one particular type.

FIG. 18 is a fragmentary partly sectional view of one exemplary modified form of the invention wherein the interior pressure increase is provided by forcible insertion thereinto of additional fluid. In this modification the device is made of material having different structural characteristics from those previously illustrated and is also shown with one specific exemplary type of intermediate stiffening sleeve.

FIG. 19 is a fragmentary partly sectional view illustrating a modification of the form of the invention illustrated in FIGS. 14–16 wherein the material of the expandable retaining means is different and has different structural characteristics. Also this form illustrates confining means adapted to control the expansion of the retaining means to inward and longitudinal expansion rather than outward expansion.

Referring to FIGS. 1–4 for exemplary purposes, one illustrative embodiment of the invention takes a typical exemplary form wherein it comprises a fastener means, indicated generally at 21, which includes a longitudinal fastener element 22 having first and second end portions 23 and 24 and an intermediate shank portion 25 therebetween adapted to be inserted into a through-aperture 26 in structural member means, such as indicated generally at 27, to which the fastener means 21 is to be affixed. In the specific example illustrated, the structural member means 27 comprises two sheets or plates 28 having opposite outer surfaces 29. However, this is exemplary only and the invention is not specifically limited to structural member means of this particular type or number.

The first end portion 23 is adapted to be positioned on one side of the structural member means 27 and the second end portion 24 is adapted to be positioned on the other side of the structural member means 27. This is clearly shown in FIG. 2.

Generally speaking, it may be said that one of the end portions comprises a head for abutment with the adjacent surface of the structural member means. In the specific form illustrated in FIGS. 1–4, the first end 23 comprises said head which is of an enlarged configuration defining a hollow interior chamber 30 therein when in the normal pre-use configuration shown in FIGS. 1 and 2.

The other end 24 of the longitudinal fastener member 22 effectively comprises an interior fluid-pressure expandable retaining portion or means indicated generally by the reference numeral 31 and best shown in FIG. 3 after such expansion.

It should be noted that the shank portion 25 defines a hollow interior chamber region 32 which extends from the interior of the fluid-pressure expandable retaining portion or means 31 through the shank 25 and into interior communication with the interior chamber means 30 in the enlarged hollow head 23. This provides an arrangement such that the forcible collapsing of the enlarged head 23, such as by pressure or impact, or the like, will cause it to collapse from the position shown in FIG. 2 into the fully collapsed position shown in FIG. 3 which will effectively force all of the liquid previously contained in the head chamber 30 downwardly through the chamber 32 in the shank 25 and into the retaining portion 31 in a manner such as to fully expand the lower portion of the shank 25 and the lower end 24 thereof into the enlarged laterally expanded retaining means best shown at 31 in FIG. 3. This expansion will be such as to engage the lower surface 29 of the structural member means 27 in opposition to the engagement of the upper surface 29 thereof by the collapsed cap means 23 whereby to firmly fasten the fastener means 21 with respect to the structural member means 27 as is clearly shown in FIG. 3.

It should be noted that, in the form of the invention illustrated in FIGS. 1–4, the hollow head 23 may be made of a flexible resilient material capable of being resiliently collapsed and held in collapsed configuration or may be made of a material having structural characteristics such that the stresses produced as a result of the collapsing or flattening thereof will exceed the yield point of the material so as to yieldably deform into a flattened configuration of the type shown in FIG. 3 and to remain in said configuration thereafter. This latter type of construction may, also, be true of the expanded retaining portion or means 31 although, in certain forms of the invention, this part of the device may not exceed the yield point of the material and may be capable of returning to its initial configuration whenever the cap means 23 is returned (forcibly or otherwise) to its initial configuration.

It should be noted that the collapsing of the cap 23 may be accomplished entirely by force or may be accomplished by force aided by heat. This latter course of action is particularly applicable where the cap 23 is made of various plastic materials, while the mechanically-caused collapsing action is particularly well adapted for use when the cap 23 is of metallic material. Either or both types of collapsing action and either or both types of material composition with respect to the collapsible head 23 and/or also with respect to the expandable and collapsible retaining means 31 may be employed either in integral arrangements or in combination arrangements.

FIGS. 5 and 6 illustrate a slight modification of the first form of the invention shown in FIGS. 1–4. Therefore, in this modification, parts similar to those shown in the first form of the invention are indicated by similar reference numerals, followed by the letter A, however. In this modification, the enlarged hollow head means 23A is interiorly provided with engagement means indicated generally at 33 and the shank portion 25A is interiorly provided with engagement means 33a. Each of said engagement means 33 and 33a is so positioned as to be adapted for retaining engagement together when said head 23A is forcibly collapsed or flattened into the position shown in FIG. 6.

It will be noted that, in the specific form illustrated in FIGS. 5 and 6, the engagement means 33 comprises a downwardly formed projection member 34 having outwardly directed projections 35 normally positioned inside of the hollow head 23A. It will also be noted that the engagement means 33a comprises inwardly directed projections carried by the inside surface of the shank portion 25A adjacent the top thereof at a location lying inside of the through-hole 26A in the structural member means 27A whereby to be exteriorly supported. The engagement of the two engagement means is accomplished by merely forcing the cap or head portion 23A downwardly until the projections 35 resiliently snap past the projections 33a into the fully retained position shown in FIG. 6. It should also be noted that the projection member 34, when in the position shown in FIG. 6, effectively acts as what might be termed inlet-outlet valve means with respect to the fluid-pressure expandable retaining means, indicated generally at 31A. Of course, while this is being accomplished, the retaining means 31A is being effectively expanded in a manner similar to that described hereinabove in connection with the retaining means 31 of the first form of the invention and will act to fully lock the entire fastener means 21A in rigidly fastened relationship with respect to the structural member means 27A.

While this modified form is shown in the figures as being made of flexible plastic or elastomeric material, it should be noted that it may be made of various other suitable materials including metal, or the like.

FIGS. 7–11 illustrate a further modified form of the invention wherein the means for increasing the interior fluid pressure in the expandable retaining means is different from that illustrated in the first form of the invention shown in FIGS. 1–4 and the modification thereof shown in FIGS. 5 and 6.

In said previously described versions, said interior fluid completely fills and is sealed within the interior of the fastener means, with the expansion of the retention means being accomplished by displacing some of the fluid from the hollow head into the retention means. On the other hand, in the form of the invention illustrated in FIGS. 7–11, the expansion of the retaining means is accomplished by forcibly *adding* additional fluid to the interior of the fastener means by way of normally closed inlet valve means. In this modification, parts similar to those illustrated in the first form of the invention are indicated by similar reference numerals, followed by the letter B, however. In this form of the invention, the head 23B is not hollow but comprises a rigid enlarged head fastened to the hollow shank 25B which is adapted to be placed through the aperture 26B in the structural member means 27B, as shown in FIG. 8, in a manner similar to the earlier forms of the invention.

However, the head or cap 23B is provided with normally closed inlet-outlet valve means, indicated generally at 36, in interior communication with the hollow interior 32B of the shank 25B and with the lower portion thereof comprising the expandable retaining portion 31B. The normally closed inlet-outlet valve means 36 is adapted to forcibly receive a quantity of pressurized fluid in addition to that initially contained within the hollow shank 32B and retaining means 31B whereby to cause the retaining means 31B to be effectively expanded into the enlarged configuration best shown in FIG. 9 which rigidly fastens the entire fastener means 21B with respect to the structural member means 27B.

In the specific form of the invention illustrated, the normally closed inlet-outlet valve means 36 comprises check valve means 37 (best shown in FIGS. 10 and 11) including a valve seat 38, a valve member 39 and biasing spring means 40 having one end resting against the shoulder 41 and having the other end resting against the bottom surface of the valve member 39 and normally biasing it against the valve seat 38 into closed sealed relationship therewith in the manner best shown in FIG. 10. The check valve 37 is surrounded by the cylindrical housing 37h which is provided with multiple apertures 42. The pressurized fluid insertion operation is shown in sequence in FIGS. 10 and 11 and comprises the insertion of the lower end of the supply needle 43 downwardly from the position shown in FIG. 10 through the aperture 43 and into abutment with the top surface of the valve member 39, followed by the downward movement of said valve member 39 against the action of the biasing spring 40 into the unseated position shown in FIG. 11. This places the longitudinal aperture 45 in the interior of the needle 43 in communication, through the egress aperture 46, with the interior of the cylindrical member 37h, which is in communication, through the apertures 42, with the hollow interior 32B of the shank 25B and the lower portion thereof comprising the retention means 31B. It will be understood that the upper end (not shown) of the needle 43 is adapted to be connected to a suitable source of fluid under pressure. This may comprise a syringe, hand pump, or other source of fluid under pressure, with the fluid usually being of a relatively incompressible type such as hydraulic liquid, or the like, although not specifically so limited.

It will be understood that when the apparatus is in the forcible injection configuration, as shown in FIGS. 9 and 11, the entry of the additional fluid will effectively expand the retaining means 31B into the configuration shown in FIG. 9.

FIGS. 12 and 13 illustrate a very slight modification of the form of the invention illustrated in FIGS. 7–11, and similar portions are indicated by similar reference numerals, followed by the letter C, however. In this modification, the normally closed inlet-outlet valve means 36C is shown as being at the lower end of the fastener means 21C rather than at the top thereof as in the form of the invention illustrated in FIGS. 7–11, although this position may be varied as desired in either version of the invention. The main difference of this modified form of the invention is the fact that the cap or head means 23C also comprises an interior fluid pressure expandable retaining means identical to the lower one indicated at 31C in FIG. 13 after expansion and in FIG. 12 before expansion. In other words, both the first or upper end 23C and the second or lower end 24C are initially of the same diameter as the intermediate shank portion 25C as shown in FIG. 12 and they are both controllably expandable under the action of fluid added to the interiors thereof through the normally closed inlet-outlet valve means 36C so as to assume the expanded enlarged locking configurations at both the top and bottom shown in FIG. 13.

It should also be noted that this form of the invention is shown for illustrative purposes as being provided with stiffener means of great structural strength comprising an interior sleeve 47 carried inside of the part of the shank portion 25C which lies immediately inside of the through-hole 26C in the structural member means 27C. However, it should be noted that said stiffener means 47 may lie outside of said shank portion part or may be integral therewith in various modifications of the invention. Furthermore, it should be noted that such a stiffener means may be employed in any or all of the various different versions of the invention and this illustration is for the purpose of clearly showing this feature of the invention in a manner applicable to all versions of the invention.

FIGS. 14–16 illustrate another modified form of the invention and similar portions are indicated by similar reference numerals, followed by the letter D, however. In this modification, the longitudinal fastener element 22D has a rigid solid enlarged head 23D, has an upper shank portion 25D, a lower shank portion 25D', and an enlarged abutment means or lip 48 carried at the lower end of the lower shank portion 25D'. The entire fastener elements 22D may be of solid high-strength material in this modification of the invention. In this modification, the expandable retaining means, indicated generally at 31D, is completely physically separate from, and non-integral with, the fastener member 22D and comprises a separate hollow chamber-defining means having a central aperture 49 extending vertically therethrough and being, in one form, longitudinally fluted or corrugated, as indicated at 50, both inside and out, for facilitating expansion thereof upon forcible injection thereinto of additional fluid by way of the normally closed inlet-outlet valve means, indicated generally at 36D. The member 22D thus comprises, in effect, a plurality of stacked toroidal segments in interior fluid communication with each other.

The central aperture 49 is adapted to be just barely sufficiently large to allow the abutment flange or lip 48 of the fastener element 22D to be forced therethrough into the relationship shown in FIG. 15 after the fastener has been initially inserted through the aperture means 26D in the structural member means 27D in the manner shown in FIG. 15. Then the hollow apertured needle means 43D is adapted to be inserted into the normally closed inlet-outlet valve means 36D in a manner similar to that previously described in connection with FIGS. 10 and 11 and additional fluid is adapted to be forced into the hollow interior of the chamber-defining means comprising the retaining means 31D so as to cause it to expand radially and longitudinally into the rigidly locked configuration shown in FIG. 16.

FIG. 17 illustrates in fragmentary partially sectional form a modification of the form of the invention illustrated in FIGS. 1–4 wherein it comprises a different material (indicated as metal, although not specifically so limited) having structural characteristics such that the stresses produced as a result of the cap head flattening operation of the type illustrated sequentially in FIGS. 2 and 3 will exceed the yield point of the material so as to yieldably deform into such flattened configuration to stay in such flattened configuration until forcibly returned to the original configuration. Portions of this modification which are similar to those illustrated in the first form of the invention shown in FIGS. 1–4 are indicated by similar reference numerals, primed, however. Additionally, it should be noted that the part of the shank portion 25' adapted to pass through the hole in the structural member means is provided with supplementary exterior stiffener means 51 of great structural strength. The above-mentioned modification of the material is also applicable to the expandable retaining means, such as that shown at 31 in FIG. 3.

FIG. 18 illustrates, in fragmentary sectional form, a modification of the form of the invention illustrated in FIGS. 7–11 comprising material changes and the provision of structural stiffener means of substantially the same characteristics as just described in connection with FIG. 17. Therefore, additional description would be redundant and is omitted. In this modification, portions similar to those shown in the form of the invention illustrated in FIGS. 7–11 are indicated by similar reference numerals, primed, however.

FIG. 19 is a fragmentary partly sectional view of the retaining means comprising a part of the form of the invention illustrated in FIGS. 14–16 wherein the material is changed in a manner generally similar to that described in detail in connection with FIG. 17 and for generally similar purposes. Therefore, additional detailed description would be redundant and is omitted. Portions of this modification similar to those illustrated in the form of the invention shown in FIGS. 14–16 are indicated by similar reference numerals, primed, however. In this modification, an additional cylindrical outer confining means 52 (shown fragmentarily in FIG. 19) is adapted to be positioned completely around the expandable retaining means 31D′ (shown fragmentarily in FIG. 19) for limiting outward expansion of said expandable retaining means and causing said expansion means to be radial inward expansion and/or longitudinal expansion. This will provide an even tighter engagement of the expandable retaining means 31D′ with the longitudinal fastening member 22D′ and with the structural member means (such as that shown at 27D in FIG. 16).

It should be noted that the present invention consists of various structural features shown in different illustrative combinations in FIGS. 1 through 19. However, all of the various possible combinations of said features would require a very much greater number of figures and would not provide any more particulars of information than do the present nineteen figures. Therefore, it should be clearly understood that the present invention is intended to include and comprehend various different combinations of said structural features in addition to the particular combinations thereof illustrated in FIGS. 1–19 for exemplary purposes only. Furthermore, various structural modifications within the basic spirit, scope, and/or teachings of the present invention will occur to those skilled in the art and are intended to be included and comprehended herein.

It should be noted that the fastener removing operation in connection with each of the various forms of the invention illustrated in FIGS. 1 through 19 and described in detail hereinbefore merely comprises the reverse operation from the fastening operation described hereinabove. In other words, in the case of the sealed-type fastener containing all of its fluid which is merely displaced from one chamber-defining portion into the expandable retaining portion or means, the unfastening operation merely comprises collapsing (usally forcibly collapsing) the expanded retaining means (usually with suitable tool means, either cold or heated, depending on the characteristics of the material) which will effectively return the interior hydraulic fluid to its original position whereby to allow the retaining means to reduce in size to its original configuration and to allow it to be withdrawn through the hole in the structural member means.

With respect to the form of the invention shown in FIGS. 5 and 6, the unfastening operation may be of the type just described or a suitable tool may be inserted into the aperture 53 and effectively hooked therein so that the tool may be pulled in order to disengage the two engagement means 33 and 33a and return the fastener means to the configuration shown in FIG. 5 from that shown in FIG. 6.

The self-contained version of the invention, wherein no additional hydraulic fluid is added to the hollow interior thereof, may include various other means for effectively varying the volume of one portion thereof whereby to force the liquid into the expandable retaining portion or means. This may comprise an effectively collapsible chamber portion of any of the types illustrated in the drawings and described hereinbefore, various equivalents thereof, and other arrangements including effectively movable piston portions for varying the interior volume of certain portions of the hollow fastener means in a manner functionally similar to the collapsing of the head illustrated in FIGS. 1–4. Such piston-like arrangements may include various means for retaining them in different volume-modifying positions with respect to the remainder of the hollow interior of the fastener means. One such form comprises threaded means receiving threaded piston means which can be threadedly advanced into the fastener means for reducing the volume in one portion of the hollow interior and for forcing the hydraulic liquid into the expandable retaining portion. It will readily be understood that various other functional equivalents may be provided for accomplishing the same purpose and that this application would be unnecessarily lengthened if all such functional equivalents were illustrated and described in detail. It is believed that the application in its present form is broad enough in scope to cover all such modificatoins within the basic outlines defined by the disclosure of the present application and the appended claims, and such variant forms and modifications are intended to be included and comprehended herein.

With respect to the forms of the invention wherein additional hydraulic fluid is inserted into the interior of the fastener means (or indirectly into the interior of the retaining means) for forcible expansion of the retaining portion or means, the unfastening operation comprises the reverse operation consisting of the insertion of the needle 43 into the normally closed inlet-outlet valve means and the removal of excess hydraulic liquid or fluid. This will allow the previously expanded retaining portion to collapse to its pre-expansion configuration of a size such as to be capable of withdrawal from the hole in the structural member means.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A fastener means including an interior fluid-pressure expandable locking portion, comprising a longitudinal fastener element having first and second retaining end portions and an intermediate shank portion therebetween adapted to be positioned in a through-aperture in structural member means to which the fastener element is adapted to be fastened, said first retaining end portion comprising a radial flange at one end of said shank, with said first retaining end portion being adapted to be positioned on one side of said structural member means and with said second retaining end portion being adapted to be positioned on the other side of said structural member means, a second radial flange at the other end of said shank, said second retaining end portion being positioned on said shank intermediate said flanges and comprising an interior fluid-pressure expandable effective retaining means, said fastener element being provided with inlet-outlet valve means in interior communication with said interior fluid-pressure expandable retaining means for the forcible reception of a quantity of pressurized fluid thereinto whereby to provide said pressurized fluid means within said interior fluid-pressure expandable retaining means for forcibly expanding same, said inlet-outlet valve means being normally closed when said interior fluid-pressure expandable effective retaining means is expanded, said fluid-pressure expandable effective retaining means being formed of a plurality of connected coaxial toroidal expandable segments having their interiors in fluid communication with each other and positioned on said shank, said segments being removable when in non-expanded position, said segments when in the expanded retained condition engaging between said structural member means and said second flange.

2. A fastener means including an interior fluid-pressure expandable locking portion, comprising a longitudinal fastener element having first and second retaining end portions and an intermediate shank portion therebetween adapted to be positioned in a through-aperture in structural member means to which the fastener element i adapted to be fastened, with said first retaining end portion being adapted to be positioned on one side of said structural member means and with said second retaining end portion being adapted to be positioned on the other side of said structural member means, at least one of said retaining end portions comprising an interior fluid-pressure expandable effective retaining means, said expandable retaining means comprising a separate removable hollow annular expandable chamber-defining means having a longitudinal central opening therethrough, said intermediate shank portion of said fastener element being received through said central opening in said retaining means and being provided with enlarged abutment means at said second retaining end portion thereof, said retaining means being provided with externally opening, spring biased normally closed fluid inlet-outlet valve means into the interior thereof for the reception of pressurized fluid means thereinto whereby to expand said retaining means so as to firmly abut said intermediate shank portion, said enlarged abutment means at one end thereof, and the structural member means adapted to be spaced from said abutment means.

3. A fastener means including an interior fluid-pressure expandable locking portion, comprising a longitudinal fastener element having first and second retaining end portions and an intermediate shank portion therebetween adapted to be positioned in a through-aperture in structural member means to which the fastener element is adapted to be fastened, with said first retaining end portion being adapted to be positioned on one side of said structural member means and with said second retaining end portion being adapted to be positioned on the other side of said structural member means, at least one of said retaining end portions comprising an interior fluid-pressure expandable effective retaining means, said expandable retaining means comprising a separate hollow annular expandable chamber-defining means having a longitudinal central opening therethrough, said intermediate shank portion of said fastener element being received through said central opening in said retaining means and being provided with enlarged abutment means at said second retaining end portion thereof, said retaining means being provided with normally closed inlet-outlet valve means into the interior thereof for the reception of pressurized fluid means thereinto whereby to expand said retaining means so as to firmly abut said intermediate shank portion, said enlarged abutment means at one end thereof, and the structural member means adapted to be spaced from said abutment means, and including a cylindrical outer confining means positioned around said expandable retaining means for limiting the expansion thereof to inward radial expansion and longitudinal expansion.

4. A fastener means including an interior fluid-pressure expandable locking portion, comprising a longitudinal fastener element having first and second retaining end portions and an intermediate shank portion therebetween adapted to be positioned in a through-aperture in structural member means to which the fastener element is adapted to be fastened, with said first retaining end portion being adapted to be positioned on one side of said structural member means and with said second retaining end portion being adapted to be positioned on the other side of said structural member means, one of said retaining end portions comprising an interior fluid-pressure expandable effective retaining means and the other one of said retaining end portions comprising an enlarged head means, said fastener element being provided with normally closed inlet-outlet valve means in interior communication with said interior fluid-pressure expandable retaining means for the forcible reception of a quantity of pressurized fluid means thereinto whereby to provide said pressurized fluid means within said interior fluid-pressure expandable retaining means for forcibly expanding same, said inlet-outlet valve means comprising check valve means carried by said enlarged head means, said check valve means including a spring pressed beveled valve member cooperating with an oppositely beveled valve seat opening exteriorly of said enlarged head means and a substantially cylindrically apertured housing interiorly of said expandable head surrounding said spring pressed beveled valve member.

5. A fastener means including an interior fluid-pressure expandable locking portion, comprising a longitudinal fastener element having first and second retaining end portions and an intermediate shank portion therebetween adapted to be positioned in a through-aperture in structural member means to which the fastener element is adapted to be fastened, with said first retaining end portion being adapted to be positioned on one side of said structural member means and with said second retaining end portion being adapted to be positioned on the other side of said structural member means, one of said retaining end portions comprising an interior fluid-pressure expandable effective retaining means and the other one of said retaining end portions comprising an interior fluid-pressure expandable head means, said fastener element being provided with normally closed inlet-outlet valve means in interior communication with said interior fluid-pressure expandable retaining means and head means for the forcible reception of a quantity of pressurized fluid means thereinto whereby to provide said pressurized fluid means within said interior fluid-pressure expandable retaining means and expandable head means for forcibly expanding both of same, said check valve means including a spring pressed beveled valve member cooperating with an oppositely beveled valve seat opening exteriorly of one of said end retaining means and a substantially cylindrically apertured housing interiorly of said one of said retaining means surrounding said spring pressed beveled valve member.

6. A fastener means including an interior fluid-pressure expandable locking portion, comprising a longitudinal fastener element having first and second retaining end portions and an intermediate shank portion therebetween adapted to be positioned in a through-aperture in structural member means to which the fastener element is adapted to be fastened, with said first retaining end portion being adapted to be positioned on one side of said structural member means and with said second retaining end portion being adapted to be positioned on the other side of said structural member means, one of said retaining end portions comprising an interior fluid-pressure expandable effective retaining means and the other one of said retaining end portions comprising hollow head means, said hollow head means, intermediate shank portion, and interior fluid-pressure expandable retaining means defining therein connected interior chamber means adapted to be provided with substantially incompressible fluid means whereby the forcible collapsing of said hollow head means will pressurize said fluid means in said fluid-pressure expandable retaining means whereby to forcibly expand same, said hollow head means being interiorly provided with engagement means and said shank portion being interiorly provided with engagement means positioned for retaining engagement with each other when said hollow head means is forcibly collapsed, said engagement means, when in said retaining engagement with each other when said hollow head means is forcibly collapsed, effectively comprising inlet-outlet valve means in interior communication with said interior fluid-pressure expandable retaining means for the forcible reception of said substantially incompressible fluid means thereinto when said hollow head means is collapsed whereby to effectively pressurize said fluid means within said fluid-pressure expandable retaining means for forcibly expanding same, said inlet-outlet valve means being normally closed when said fluid-pressure expandable effective retaining means is expanded.

7. A device as defined in claim 6, wherein said hollow head means is made of a material having characteristics such as to remain in a collapsed configuration after said forcible collapsing thereof.

8. A device as defined in claim 6, wherein said hollow head means is made of a material having structural characteristics such that the stresses produced as a result of said forcible collapsing thereof will exceed the yield point of the material so as to yieldably deform into and thereafter remain in a collapsed configuration.

9. The structure of claim 8 wherein said hollow head means is provided with a protuberance and a socket for receiving said protuberance for retaining said head and shank in engagement with each other when said head is in collapsed position.

References Cited by the Examiner
UNITED STATES PATENTS

| | | | |
|---|---|---|---|
| 2,324,520 | 7/43 | Lamson | 85—65 |
| 2,492,605 | 12/49 | Varney et al. | 85—40 |
| 2,842,022 | 7/58 | Semmion | 85—40 |

CARL W. TOMLIN, *Primary Examiner.*

EDWARD C. ALLEN, *Examiner.*